(12) United States Patent
Hampel et al.

(10) Patent No.: US 9,674,671 B2
(45) Date of Patent: Jun. 6, 2017

(54) MESSAGE PROCESSING BASED ON THE RECEPTION CONDITION OF SATELLITE SIGNALS

(71) Applicant: QUALCOMM Incorporated, San Diego, CA (US)

(72) Inventors: Karl Georg Hampel, New York, NY (US); Junyi Li, Chester, NJ (US); Vincent Douglas Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/867,835

(22) Filed: Sep. 28, 2015

(65) Prior Publication Data

US 2017/0094476 A1 Mar. 30, 2017

(51) Int. Cl.
*H04W 64/00* (2009.01)
*H04W 4/04* (2009.01)
*H04W 72/08* (2009.01)

(52) U.S. Cl.
CPC .......... *H04W 4/043* (2013.01); *H04W 72/085* (2013.01)

(58) Field of Classification Search
CPC ..... H04W 64/003; H04W 4/02; H04W 4/005; H04L 67/12
USPC .......... 455/41.1–2, 404.2, 414.1, 414.2, 440, 455/456.1, 456.2, 457
See application file for complete search history.

(56) References Cited

U.S. PATENT DOCUMENTS

| | | | |
|---|---|---|---|
| 9,326,097 B2* | 4/2016 | Sen .................... | H04W 4/02 |
| 9,338,610 B2* | 5/2016 | Saitoh .................. | H04W 4/043 |
| 9,442,179 B2* | 9/2016 | Do ........................ | G01S 19/12 |
| 2013/0238234 A1* | 9/2013 | Chao .................... | G01C 21/206 701/409 |
| 2013/0279543 A1* | 10/2013 | Torimoto ............. | G01C 21/206 375/146 |
| 2014/0080511 A1* | 3/2014 | Saitoh .................. | H04W 4/043 455/456.1 |
| 2014/0274031 A1 | 9/2014 | Menendez | |
| 2015/0271632 A1* | 9/2015 | Venkatraman ......... | H04W 4/02 455/456.2 |
| 2016/0029224 A1* | 1/2016 | Edge ..................... | G01S 5/0252 455/456.1 |
| 2016/0077210 A1* | 3/2016 | Opshaug ................ | G01S 19/03 342/357.4 |

FOREIGN PATENT DOCUMENTS

| | | |
|---|---|---|
| EP | 1635185 A2 | 3/2006 |
| EP | 2608578 A1 | 6/2013 |
| JP | H09297171 A | 11/1997 |

OTHER PUBLICATIONS

International Search Report and Written Opinion—PCT/US2016/048011—ISA/EPO—Dec. 7, 2016.

* cited by examiner

*Primary Examiner* — Cong Tran
(74) *Attorney, Agent, or Firm* — Arent Fox

(57) ABSTRACT

A method, an apparatus, and a computer-readable medium for wireless communication are provided. The apparatus may be a mobile device. The apparatus receives signals from one or more satellites. The apparatus determines an indoor/outdoor classification attribute of the apparatus among a plurality of indoor/outdoor classification attributes based on a number of satellites from which the apparatus receives the signals. The apparatus receives a message. The apparatus determines whether to forward the message based on the indoor/outdoor classification attribute and a type of the message.

30 Claims, 13 Drawing Sheets

MESSAGE PROCESSING BASED ON THE RECEPTION CONDITION OF SATELLITE SIGNALS

BACKGROUND

Field

The present disclosure relates generally to communication systems, and more particularly, to a message processing by a device.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Mobile devices may be configured to receive various services using one or more wireless communication systems. Conditions such as location information of a mobile device are often considered to process service signals for the mobile device based on the conditions. For example, a mobile device may be configured to function differently in one condition than when the mobile device is in another condition. An infrastructure surrounding the mobile device may also provide valuable information to the mobile device, although the infrastructure information has not been actively studied. Therefore, various improvements may be made for a mobile device to consider the infrastructure surrounding the mobile device when processing a service.

SUMMARY

In an aspect of the disclosure, a method, a computer-readable medium, and an apparatus are provided. The apparatus may be a mobile device. The apparatus receives signals from one or more satellites. The apparatus determines an indoor/outdoor classification attribute of the apparatus among a plurality of indoor/outdoor classification attributes based on a number of satellites from which the apparatus receives the signals. The apparatus receives a message. The apparatus determines whether to forward the message based on the indoor/outdoor classification attribute and a type of the message.

DETAILED DESCRIPTION

Figure 1:
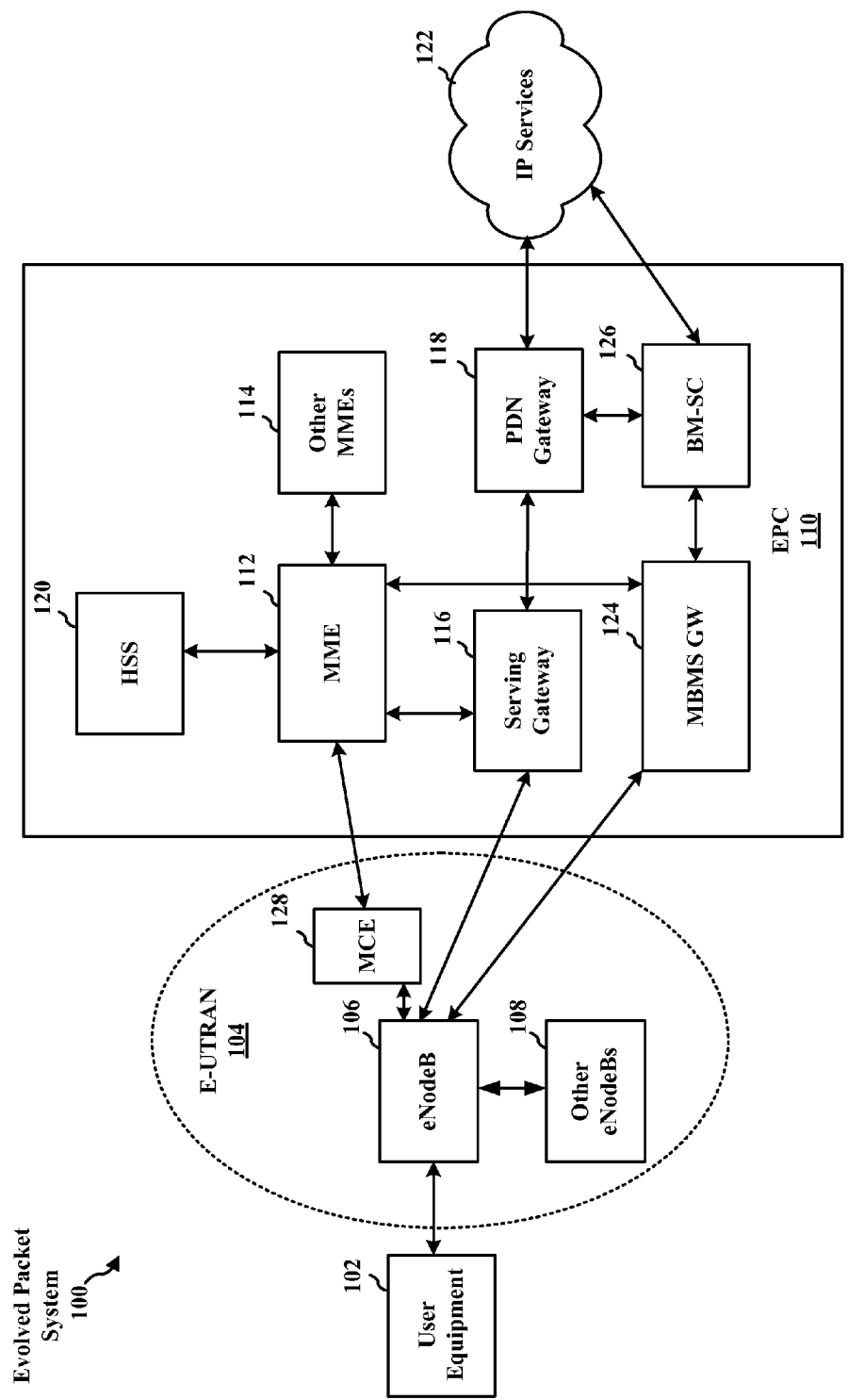
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
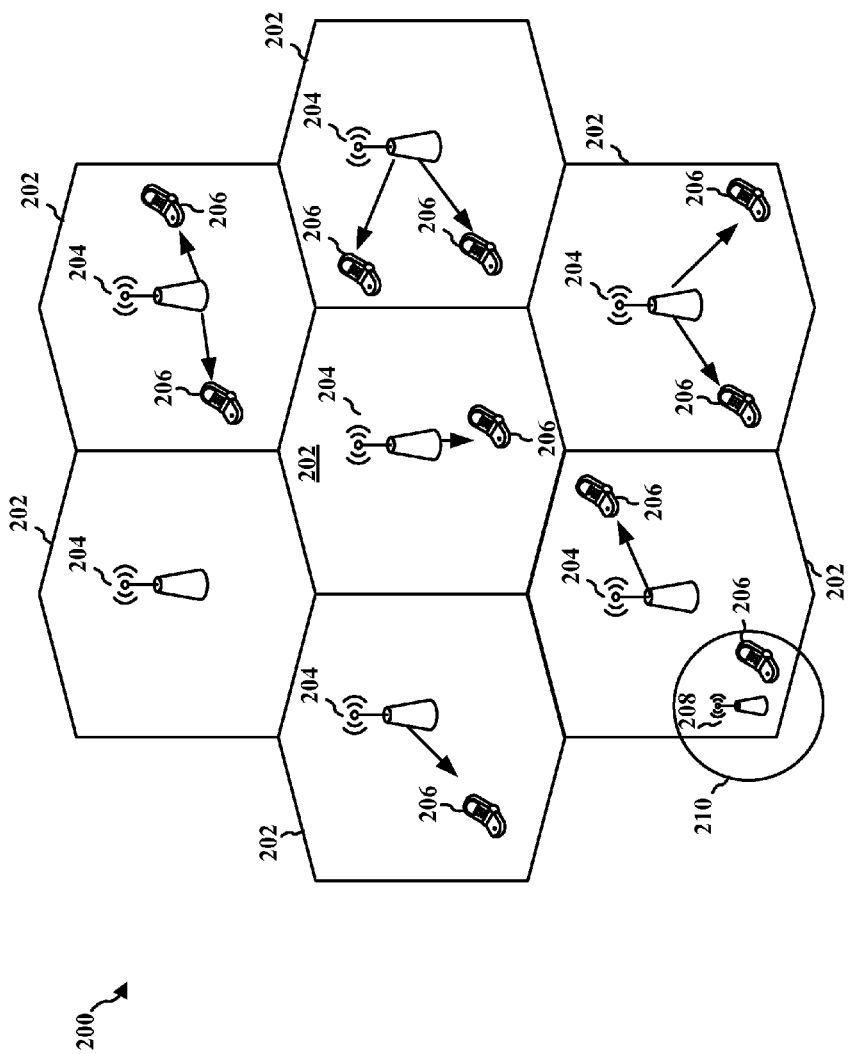
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
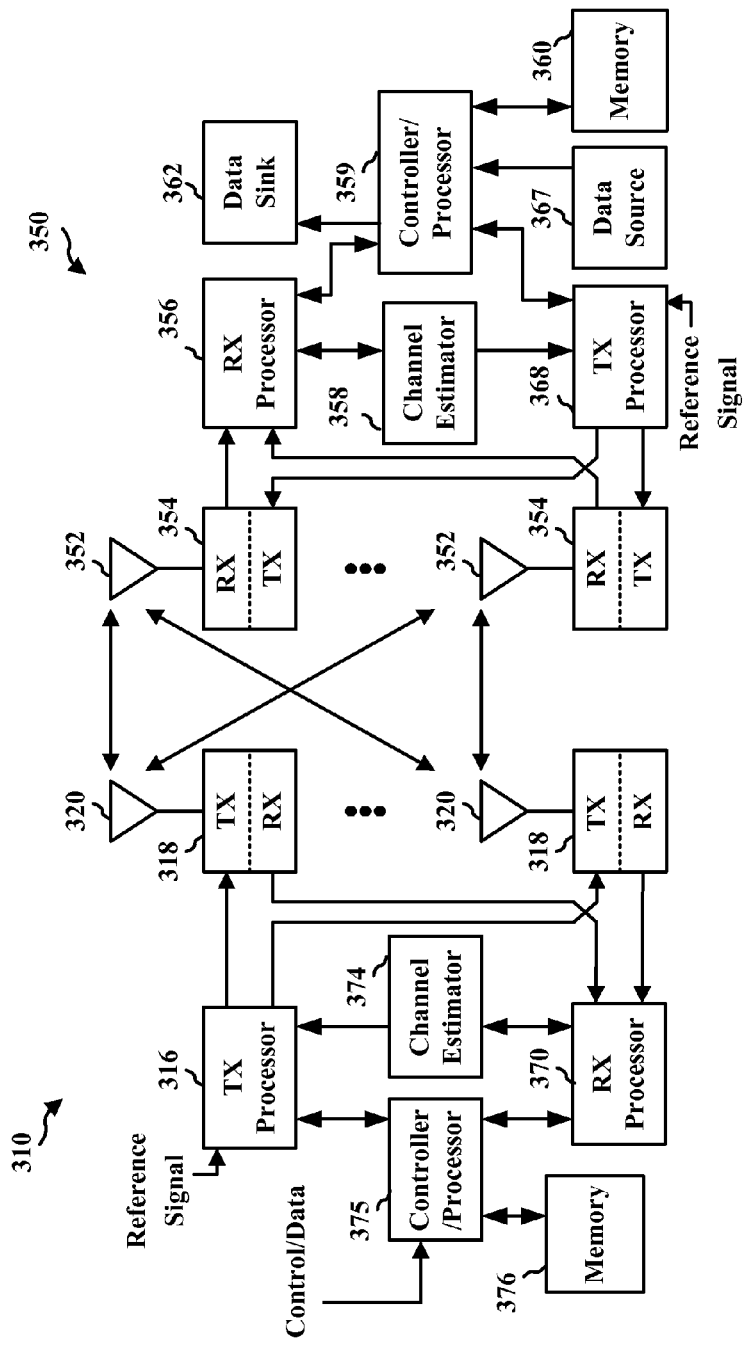
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions include coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
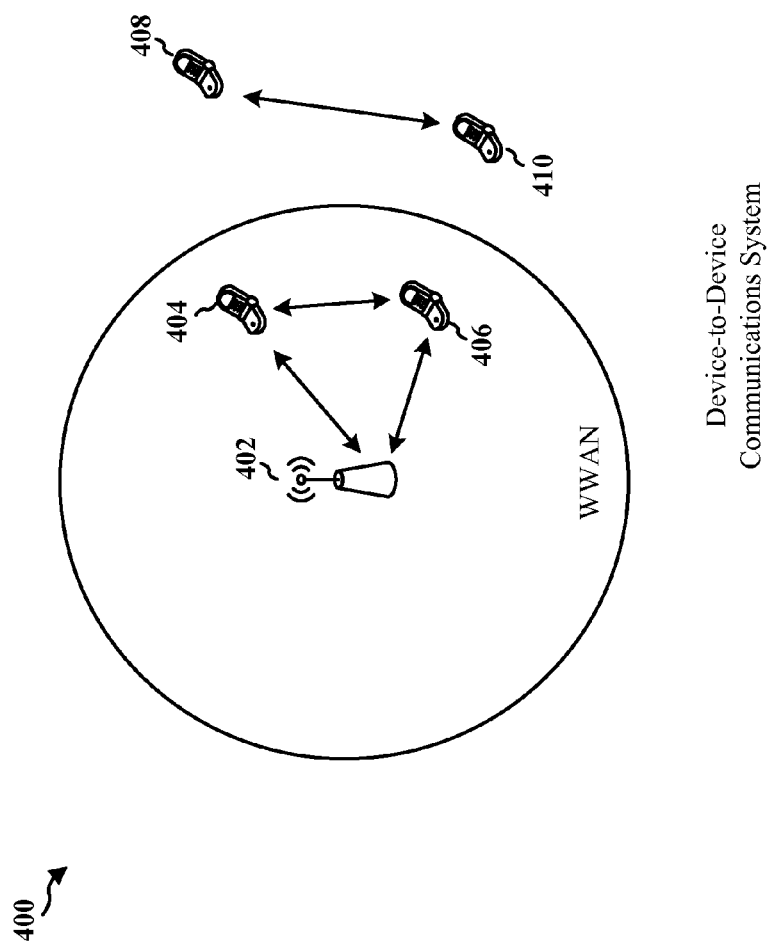
FIG. 4 is a diagram of a device-to-device communications system.

FIG. 4 is a diagram of a device-to-device communications system 400. The device-to-device communications system 400 includes a plurality of wireless devices 404, 406, 408, 410. The device-to-device communications system 400 may overlap with a cellular communications system, such as for example, a wireless wide area network (WWAN). Some of the wireless devices 404, 406, 408, 410 may communicate together in device-to-device communication using the DL/UL WWAN spectrum, some may communicate with the base station 402, and some may do both. For example, as shown in FIG. 4, the wireless devices 408, 410 are in device-to-device communication and the wireless devices 404, 406 are in device-to-device communication. The wireless devices 404, 406 are also communicating with the base station 402.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

A mobile device such as a UE may be configured to receive, to send, and/or to relay a message. The mobile device may be configured to process a message such that the message may be communicated when a certain condition is satisfied. One condition that may be considered by the mobile device may be location information. The mobile device may obtain location information based on measurements of radio signals that are transmitted in a specific manner with respect to the mobile device's surrounding infrastructure. For example, the location information may be obtained based on global positioning service (GPS) satellite signals, by determining the location of the mobile device based on signals from the satellites. Thus, approaches may be developed to consider the mobile device's location when the mobile device performs certain functions. However, currently, autonomous classification of the mobile device's location with respect to whether the mobile device is indoors or outdoors has not been fully utilized for processing a message. For mobile devices, for example, context-aware wireless services (e.g., proximity services) may benefit from autonomous indoor/outdoor classification of the mobile device to conveniently process a message based on the indoor/outdoor classification that indicates whether the mobile device is indoors or outdoors. Therefore, an approach to utilize the autonomous classification of the mobile device's location for a wireless service is desired.

For example, in a proximity service, a service device sends (e.g., broadcasts) a message, and neighbor devices receive the message, where the fact that the neighbor devices can receive the message from the service device implies that the neighbor devices are in proximity of the service device. As an example of a proximity service, a device at a grocery store may disseminate a coupon using a proximity service such that a user walking by the grocery store and in proximity of the grocery store's device may receive the coupon on the user's device via the proximity service. It may be desirable to extend the proximity service with information on the indoor/outdoor classification of various devices that can receive a message via the proximity service.

According to an aspect of the disclosure, a mobile device (e.g., a UE) determines the mobile device's indoor/outdoor classification attribute based on reception conditions of satellite signals. For example, the mobile device determines how many satellite fixes are obtained (e.g., by determining a number of satellites from which the device is able to receive signals). Based on the number of satellite fixes, the mobile device may determine a location information about the mobile device that indicates that the mobile device is indoors or outdoors or in-between the indoors and the outdoors, thus autonomously determining the indoor/outdoor classification of the mobile device. The mobile device may additionally estimate how the satellites with satellite fixes with the mobile device are located with respect to the mobile device's location, and may utilize such information to process a received message. In an aspect, the mobile device may measure signal strength of a signal received from a satellite and determine whether the mobile device has successfully received a signal to obtain a satellite fix. For example, the mobile device may determine that the mobile device has successfully received a signal from a satellite to obtain a satellite fix if the signal strength of the signal is above a signal strength threshold.

Further, according to an aspect of the disclosure, the mobile device may maintain policies that define message processing rules for different types of messages, and the mobile device may apply a processing rule associated with a particular message type based on the mobile device's indoor/outdoor classification. For example, when utilizing a processing rule based on the indoor/outdoor classification, the mobile device may apply a different processing rule for a coupon type message than for an emergency type message. Thus, when a message is received, the mobile device matches a policy with a type of the message, and applies the processing rule of the matched policy in order to determine whether to forward the message based on the indoor/outdoor classification attribute. The message may be forwarded to an application to output the message, or may be forwarded to a communication interface or to another device, based on the processing rule. If there is no policy that matches with the type of the received message, the mobile device may drop the message and may not forward the message.

There may be various use cases that utilize the indoor/outdoor classification of the mobile device according to the disclosure. In a fire alert service example, a fire alert service may want to alert an evacuation request message to indoor users, and may not notify users outside. In particular, when mobile devices receive an evacuation request message, the mobile devices that are indoors may output the evacuation request message while the mobile devices that are outdoors may not output the evacuation request message. After a fire drill, the fire alert service may want to alert a "return-tothe-premises" notification message to users that are waiting outside, and may not notify users inside. In particular, when mobile devices receive such notification message, the mobile devices that are outdoors may output the notification message while the mobile devices that are indoors may not output the notification message. In a coupon distribution example, a coffee shop may want to notify coupons to users passing by the coffee shop outside (e.g., to attract the users to the coffee shop), rather than to customers that are already waiting at the coffee counter inside. In such an example, when mobile devices receive the coupon message from the coffee shop, the mobile devices located outside the coffee shop building may output the coupon message, but mobile devices located the coffee shop building may not output the coupon message. In a special bargain example, a department store may limit special bargains to only customers that are inside the department store, and not to people outside the department store. In such an example, when mobile devices receive the bargain message from the department store, the mobile devices located inside the department store building may output the bargain message, but mobile devices located inside the department store building may not output the bargain message.

In a relay service example, a relay service may want to enable multi-hop range extension of device-to-device (D2D) discovery/communication only for in-to-out and out-to-in proximity events, where the in-to-out event involves relaying a message from a device located indoors to a device located outdoors and the out-to-in involves relaying a message from a device located outdoors to a device located indoors. D2D communication between devices may be performed over WWAN, Wi-Fi, etc. To notify users beyond a range of a service device, the relay service may be implemented such than a mobile device is capable of relaying a message (e.g., discovery message) from the service device to another mobile device. For example, when a service device in a building transmits a message, the transmission of the message may not reach far from the building. Thus, a mobile device may receive a message (e.g., discovery message) from the service device and relay the message to other mobile devices, which results in multi-hop communication to mobile devices that are away from the building. It may be desirable to restrict the relay feature to mobile devices that are near a window of the building or near outside the building. Thus, when a mobile device receives a message relayed from a relaying device, the mobile device may output the relayed message only for an in-to-out event where the relaying device is indoors and the mobile device is outdoors and for out-to-in events where the relaying device is outdoors and the mobile device is indoors.

As discussed, the mobile device may determine the indoor/outdoor classification attribute based on GPS signals such as global navigation satellite system (GNSS) signals from satellites. Use of satellites to characterize the device's indoor/outdoor classification is advantageous for at least the following reasons. Because satellites are generally located outside and satellite visibility is obstructed by building walls and/or other obstructions, obstruction of satellite signals may imply that the device is indoors while little or no obstruction of satellite signals may imply that the device is in outdoors. The mobile device is generally surrounded by multiple GNSS sources (e.g., multiple satellites) at any time of the day and thus can derive the mobile device's locations at any time, as long as there are no significant obstructions of satellite signals. Many mobile devices are furnished with GPS signal receivers (e.g., GNSS receivers), and may be configured to conduct GNSS measurements in the background. Thus, for mobile devices with such configuration, GPS signal information may be readily available. The indoor/outdoor classifications may be more refined based not only on the received satellite signals but also on locations of satellites as the device may determine satellite locations based on GNSS signals.

The autonomous determination of the indoor/outdoor classification is explained more in detail as follows. In an aspect of the disclosure, the mobile device searches through the GNSS signal space, and determines a number of satellites that the mobile device can receive the GNSS signals from (e.g., a number of satellite fixes). Subsequently, the mobile device may determine an infrastructure-related classification (e.g., indoor/outdoor classification) based on the number of satellite fixes. The number of satellite fixes may be mapped to a corresponding indoor/outdoor classification. Table 1 shows an example of the number of satellite fixes mapped to a corresponding indoor/outdoor classification.

TABLE 1

Indoor/outdoor classification based on a number of GPS satellite fixes.

| Number of GPS satellite fixes | Indoor/Outdoor classification |
| --- | --- |
| ≥3 | Outdoors |
| 2 | In-between |
| ≤1 | Indoors |
| GPS chips not activated | No data available |

As shown in Table 1, if the number of satellite fixes is equal to or greater than three, the mobile device determines that the indoor/outdoor classification attribute for the mobile device is "outdoors." If the number of satellite fixes is equal to two, the mobile device determines that the indoor/outdoor classification attribute for the mobile device is "in-between," indicating that the mobile device is located in-between the indoors and the outdoors. If the number of satellite fixes is less than or equal to one, the mobile device determines that the indoor/outdoor classification attribute for the mobile device is "indoors." Data on the indoor/outdoor classification may not be available if no GPS chip is activated.

Figure 5C:
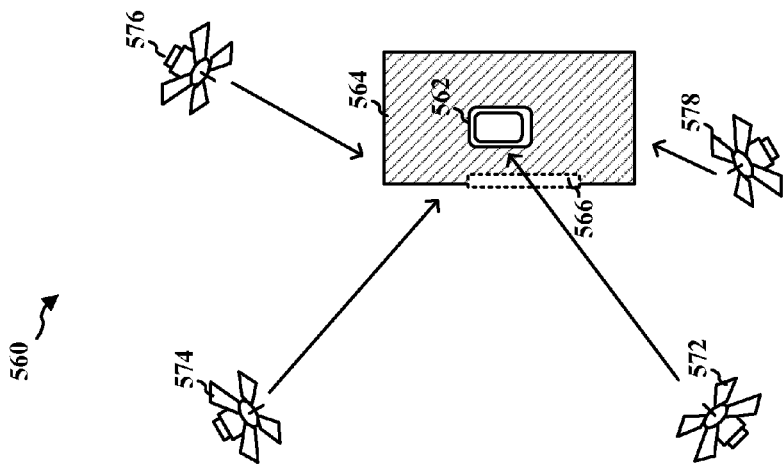
FIGS. 5A-5C are example diagrams illustrating various scenarios of satellite signal reception by a mobile device.
Figure 5B:
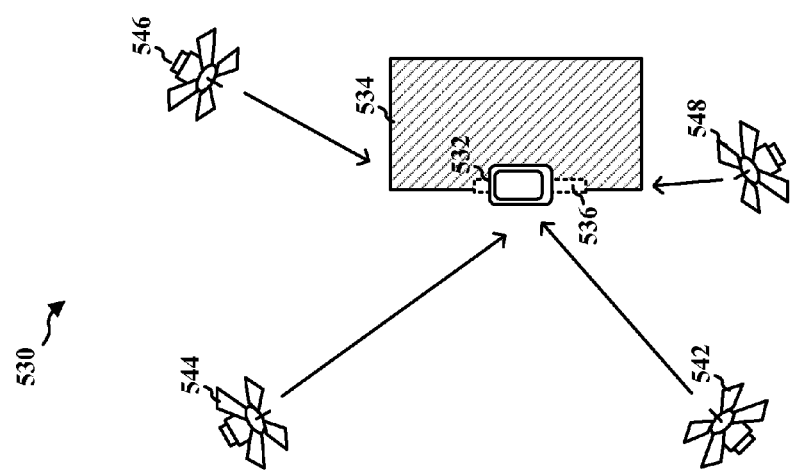
Figure 5A:
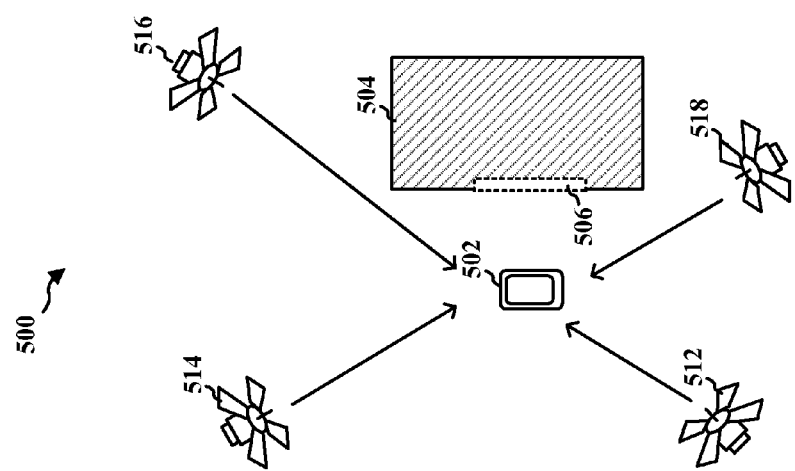

FIGS. 5A-5C are example diagrams illustrating various scenarios of satellite signal reception by a mobile device, where the example diagrams are illustrated as top views (views from above). FIGS. 5A-5C may illustrate the use of the mapping between the number of satellite fixes and the indoor/outdoor classification in Table 1. FIG. 5A is an example diagram 500 illustrating satellite reception of a mobile device located outside. The example diagram 500 includes a UE 502, a building 504 with an entrance 506, and four satellites 512, 514, 516, and 518. Because the UE 502 is outside and the building 504 is not blocking any of the satellites 512, 514, 516, and 518 from the UE 502, the UE 502 may be able to receive signals from all four satellites 512, 514, 516, and 518, and thus the UE 502 has four satellite fixes. Based on Table 1, the UE 502 may determine that the indoor/outdoor classification attribute for the UE 502 is "outdoors" because the UE 502 has more than three satellite fixes.

FIG. 5B is an example diagram 530 illustrating satellite reception of a mobile device located at an entrance of a building. The example diagram 530 includes a UE 532, a building 534 with an entrance 536, and four satellites 542, 544, 546, and 548. In the example diagram 530, the UE 532 is at the entrance 536 of the building 534, and thus may not be able to receive signals from all satellites. In particular, in the example diagram 530, the UE 532 receives signals from two satellites (the first satellite 542 and the second satellite 544), and thus the UE 532 has two satellite fixes. The UE 532 cannot receive signals from the other two satellites (the third satellite 546 and the fourth satellite 548) because the satellite receptions for the third satellite 546 and the fourth satellite 548 are blocked by walls of the building 534. Based on Table 1, the UE 532 may determine that the indoor/outdoor classification attribute for the UE 532 is "in-between" because the UE 532 has two satellite fixes.

FIG. 5C is an example diagram 560 illustrating satellite reception of a mobile device located inside a building. The example diagram 560 includes a UE 562, a building 564 with an entrance 566, and four satellites 572, 574, 576, and 578. If the UE 562 is completely inside the building 564, and thus may not be able to receive signals from most of the satellites or may not be able to receive signals from any satellite. In the example diagram 560, because the UE 562 is completely inside the building 564, the UE 562 is able to receive signals from only the first satellite 572, and thus has one satellite fix. The UE 562 cannot receive signals from the other three satellites (the second satellite 574, the third satellite 576, and the fourth satellite 578) because the satellite receptions for the second satellite 574, the third satellite 576, and the fourth satellite 578 are blocked by walls of the building 564. Based on Table 1, the UE 562 may determine that the indoor/outdoor classification attribute for the UE 562 is "indoors" because the UE 562 has one or less satellite fix.

According to an aspect of the disclosure, the indoor/outdoor classification may be more refined by considering locations of satellites for which satellite fixes are obtained, with respect to a location of the mobile device, in addition to considering the number of satellite fixes. The location of the mobile device may be determined based on the satellite fixes, or Wi-Fi location estimation, or other location estimation method. The refined indoor/outdoor classification may be further improved with assistance of map information of an area around the mobile device. It is noted that, to utilize the non-refined indoor/outdoor classification, the mobile device may not need information on the location of the mobile device, because the non-refined indoor/outdoor classification is based on the number of satellite fixes, as shown in Table 1.

Various examples of the refined indoor/outdoor classification are explained as follows. In one example, if locations of the satellites with satellite fixes are from various sides of the mobile device, the mobile device may determine that the mobile device is outside in an open area, without a building or a wall blocking satellite signals. In such an example, the mobile device may determine that the indoor/outdoor classification attribute is "open area." In another example, if locations of all or most satellites with satellite fixes are on a same side of the mobile device, the mobile device may determine that the opposite side of the mobile device is a building or a wall blocking certain satellite signals. Thus, in such an example, the mobile device may determine that the indoor/outdoor classification attribute is "at a side of a building." In another example, if locations of satellites with satellite fixes are within two narrow angular visibility ranges in opposite sides, with the mobile device at a center of the angular visibility ranges, the mobile device may determine that the mobile device is surrounded by buildings (e.g. thus is located in an urban street canyon). In such an example, the mobile device may determine that the indoor/outdoor classification attribute is "inside street canyon." In another example, if the mobile device determines one or two satellite fixes, the mobile device may determine that the mobile device is located indoors, near an opening such as a window or a door. In such an example, the mobile device may determine that the indoor/outdoor classification attribute is "indoors near a window." In another example, if the mobile device determines zero satellite fix, the mobile device may determine that the mobile device is located indoors, away from an opening such as a window or a door. In such an example, the mobile device may determine that the indoor/outdoor classification attribute is "deep indoors."

Figure 6:
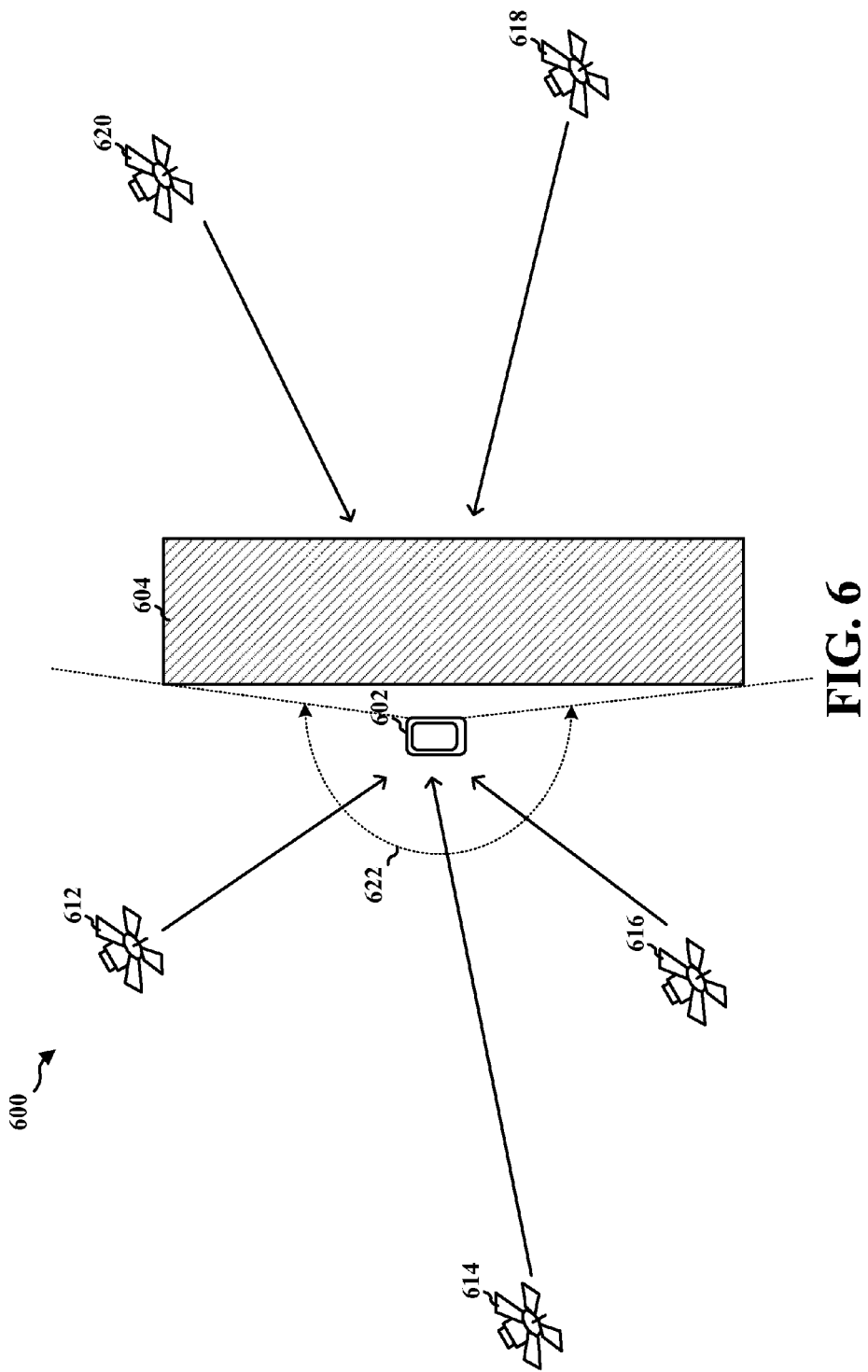
FIG. 6 illustrates an example diagram where a mobile device is located on one side of a building.
Figure 7:
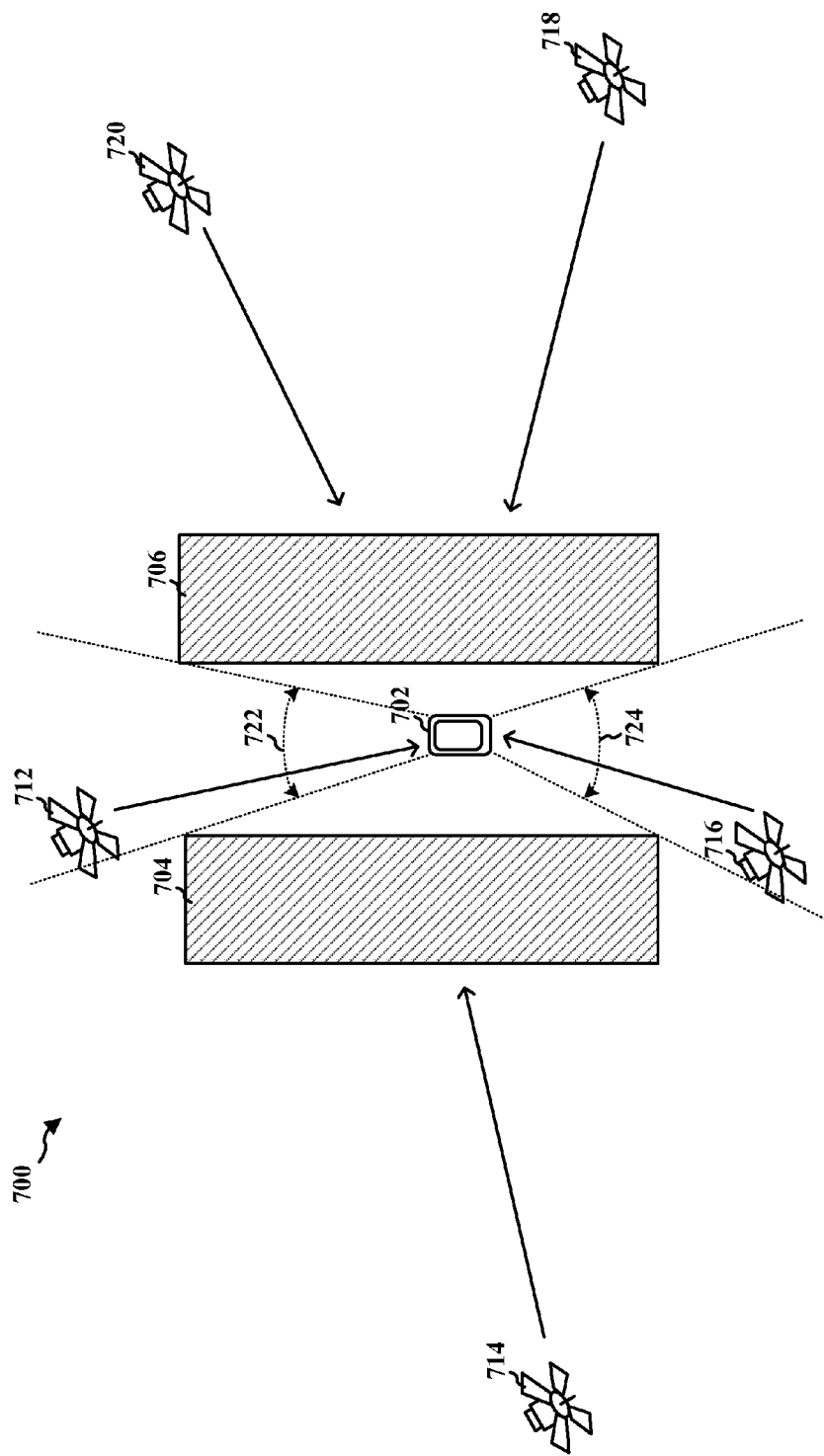
FIG. 7 illustrates an example diagram where a mobile device is located between two buildings.
Figure 8:
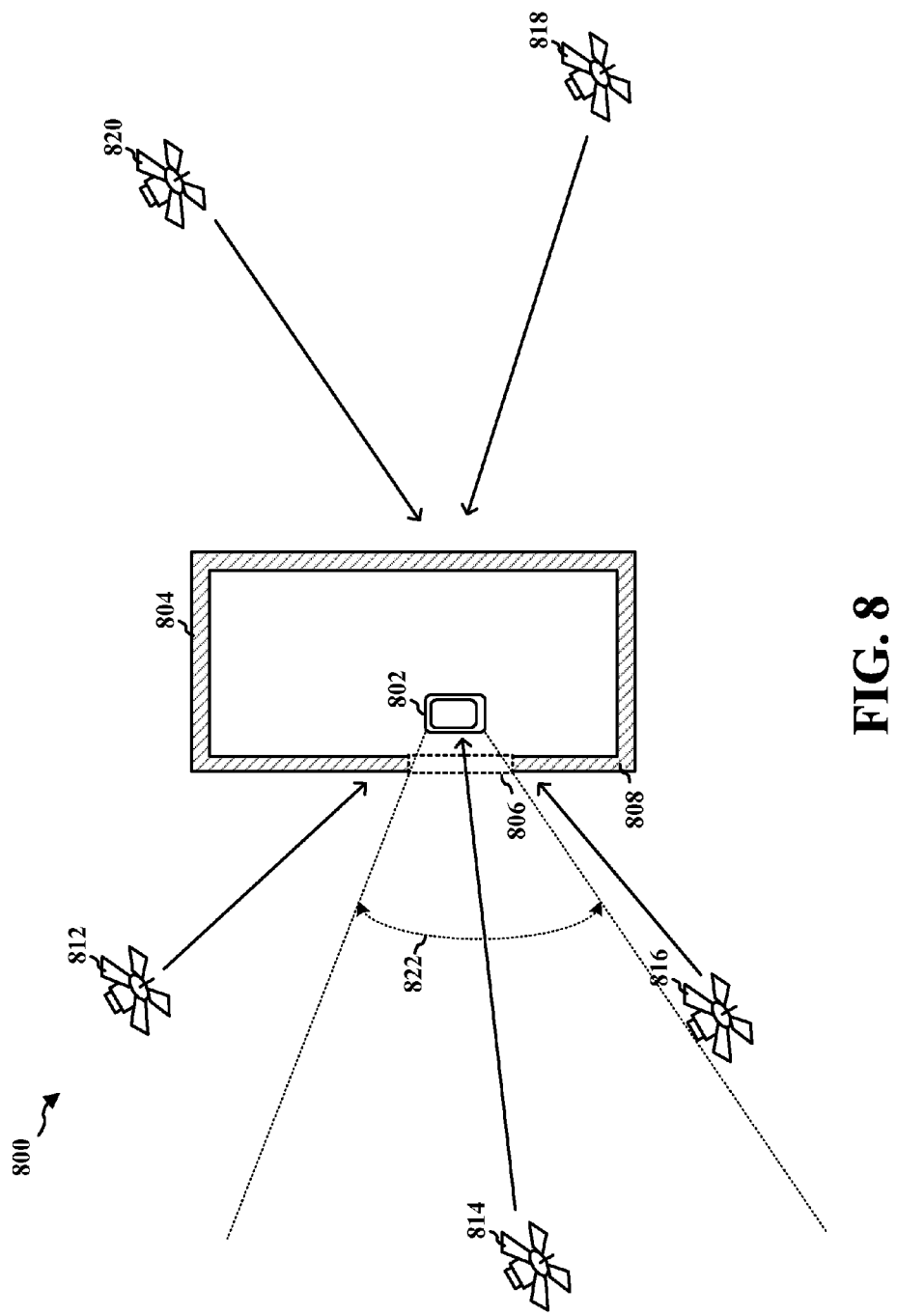
FIG. 8 illustrates an example diagram where a mobile device is located inside of a building.

FIGS. 6-8 illustrate example diagrams of various scenarios of satellite reception, for refined indoor/outdoor classification. The example diagrams of FIGS. 6-8 are illustrated as views from above. FIG. 6 illustrates an example diagram 600 where a mobile device is located on one side of a building. The example diagram 600 includes a UE 602, a building 604, and five satellites 612, 614, 616, 618, and 620. In the example diagram 600, the UE 602 is at the left side the building 604. Therefore, the UE 602 is able to receive signals from the satellites 612, 614, and 616 that are located on the left side of the building 604, within the satellite visibility range 622 of the UE 602. The UE 602 is not able to receive signals from the satellites 618 and 620 that are on the right side of the building 604 because the building 604 blocks the signals from the satellites 618 and 620. The UE 602 may estimate a location of the UE 602 based on the satellite fixes with the satellites 612, 614, and 616, and may determine that all of the satellites with satellite fixes are all on the left side of the UE 602. Consequently, the UE 602 may determine that there is a building or a wall located on the right side of the UE 602. In this example, the UE 602 may determine that the indoor/outdoor classification attribute is "at a side of a building."

FIG. 7 illustrates an example diagram 700 where a mobile device is located between two buildings. The example diagram 700 includes a UE 702, a first building 704, a second building 706, and five satellites 712, 714, 716, 718, and 720. In the example diagram 700, the UE 702 is located between the first building 704 and the second building 706. Therefore, the UE 702 is able to receive signals from the satellites 712 and 726, and thus have two satellite fixes with the satellites 712 and 726. The UE 702 cannot receive signals from the satellite 714 because the signals from the satellite 714 are blocked by the first building 704. The UE 702 cannot receive signals from the satellites 718 and 720 because the signals from the satellites 718 and 720 are blocked by the second building 706. The UE 602 may estimate a location of the UE 702 based on the satellite fixes with the satellites 712 and 716, and may determine that one satellite (e.g., satellite 712) with the satellite fix is located on one side of the UE 702 and that the other satellite (e.g., satellite 716) with the satellite fix is located on the opposite side of the UE 702. In particular, the UE 702 may determine that the location of the satellite 712 is within a first narrow angular visibility range 722 and the location of the satellite 716 is within a second narrow angular visibility range 724 that is on the opposite side from the first narrow angular visibility range 722. Consequently, the UE 702 may determine that the UE 702 is located between buildings, and is thus located in an urban street canyon. Thus, in this example, the UE 702 may determine that the indoor/outdoor classification attribute is "inside street canyon."

FIG. 8 illustrates an example diagram 800 where a mobile device is located inside of a building. The example diagram 800 includes a UE 802, a building 804 with a window 806 and walls 808, and five satellites 812, 814, 816, 818, and 820. In the example diagram 800, the UE 802 is located inside the building 804 near the window 806. Therefore, the UE 802 is able to receive signals from the satellite 814 that is positioned directly in line with the window 806, within the satellite visibility range 822. However, the UE 802 cannot receive signals from the satellites 812, 816, 818, and 820 because the walls 808 block the signals from the satellites 812, 816, 818, and 820. The UE 802 may estimate a location of the UE 802 based the satellite fix with the satellite 814. The UE 802 may additionally rely on other location estimation methods to estimate the location of the UE 802, if the satellite fix does not provide sufficient information for the location estimation. The UE 802 may determine that there is only one satellite fix, and the satellite fix is with the satellite 814 located in line with the UE 802 near the window 806. Consequently, the UE 802 may determine that the UE 702 is located inside of a building near a window. Thus, in this example, the UE 702 may determine that the indoor/outdoor classification attribute is "indoors near a window."

Figure 9:
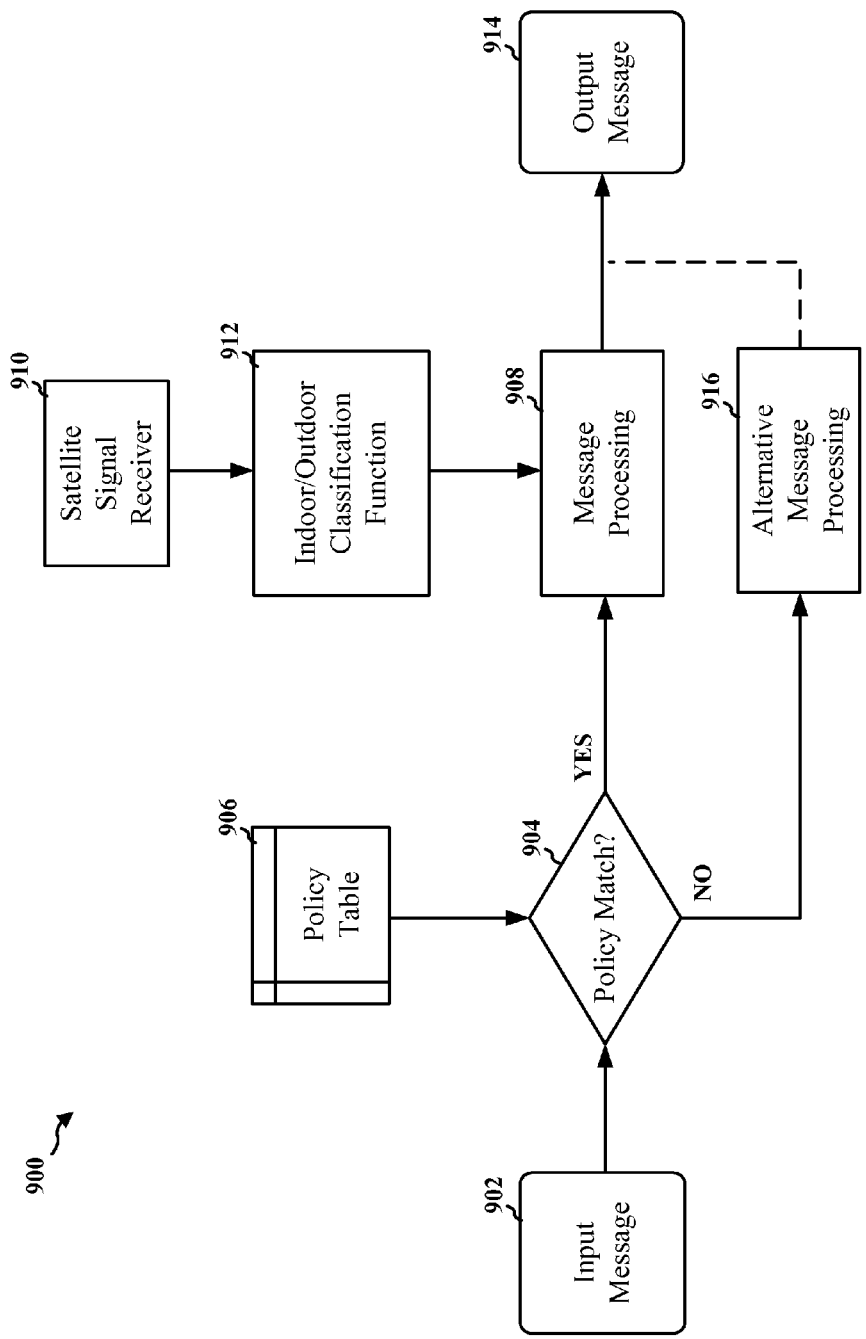
FIG. 9 is an example flow diagram illustrating an overall process according to an aspect of the disclosure.

FIG. 9 is an example flow diagram 900 illustrating an overall process according to an aspect of the disclosure. The process in the flow diagram 900 may take place within a mobile device. When a message received at 902, the mobile device determine at 904 if there is a match between a type of the message and one of the message processing policies maintained by the mobile device. The mobile device may determine at 904 if there is a match between the type of the message and a policy based on a policy table 906. The mobile device may maintain the policy table 906 that includes message processing policies based on the indoor/outdoor classifications. Each policy in the policy table 906 defines matching criteria such that each policy corresponds with a particular type of a message. Each policy further includes processing rules (e.g., processing conditions and associated actions) for a corresponding type of a message. Thus, the matching criteria may restrict the message processing to message processing based on the processing rules corresponding to the type of the message. The matching criteria for the type of the message may be based on various factors such as an application from which the message is sent, a message characteristic or a message content such as a specific string contained in a message header field, a communication interface through which the message was received, a communication interface through which the message is to be forwarded.

If the type of the message matches with one of the policies maintained in the policy table, the mobile device processes the message at 908 according to processing rules of the matching policy based on indoor/outdoor classification of the mobile device. A processing function in the mobile device may process the message at 908. The indoor/outdoor classification of the mobile device may be provided by the indoor/outdoor classification function 912. The mobile device may obtain the indoor/outdoor classification based on signals (e.g., GNSS signals) received from one or more satellites, via a satellite signal receiver 910. Based on the message processing at 908, the mobile device determines whether to forward the message. If the mobile device determines to forward the message, the mobile device outputs the message at 914. If the mobile device does not determine to forward the message, the mobile device may drop the message.

If the type of the message does not match with any of the policies maintained in the policy table, the mobile device may perform alternative message processing at 916. The alternative message processing at 916 may not consider the indoor/outdoor classification. After the alternative message processing 916, the message may be dropped and thus may not be forwarded.

The mobile device may receive the message via a communication interface (e.g., a wireless interface), from an internal interface within the mobile device, and/or from a higher protocol layer (e.g., an application layer). If the mobile device determines to forward the received message, the mobile device may forward the message to at least one of a communication interface (e.g., a wireless interface), to an internal interface within the mobile device, or to a higher protocol layer (e.g., an application layer), based on the matching policy. The processing rule of the matching policy may define to which destination the message should be forwarded.

In one aspect, at 904, the mobile device may determine to forward the message to the alternate message processing 916 based on secondary criteria. After the alternative message processing 916, the message may be dropped. In an aspect, the mobile device may consider a current channel condition or a network condition on one or more communication interfaces utilized for receiving and/or forwarding the message. For example, if the mobile device determines that a load on a communication interface (e.g., wireless interface) is greater than a load threshold, the mobile device may drop the message and thus may refrain from forwarding the message. In such a case, the mobile device may perform the alternative message processing 916 and drop the message, instead of the message processing 908 based on the indoor/outdoor classification. In an example with a relay service, the mobile device may forward only preferred messages when the load on the communication interface is greater than the load threshold, whereas the mobile device may forward all messages when the load of the communication interface is less than or equal to the load threshold.

In another aspect, the mobile device may consider at least one of service subscription information, a battery level of the mobile device, a number of messages processed, the time of the day. In one example, the mobile device may perform the message processing 908 based on the indoor/outdoor classification if the mobile device determines at 904 that a user of the mobile device has subscribed to a service or a channel associated with the received message. If the mobile device determines at 904 that the user of the mobile device is not subscribed to a service or a channel associated with the received message, the mobile device may perform the alternative message processing 916 and drop the message, instead of the message processing 908 based on the indoor/outdoor classification. In one example, if the mobile device determines that the battery level of the mobile device is low (e.g., lower than a battery threshold), the mobile device may perform the alternative message processing 916 and drop the message, instead of the message processing 908 based on the indoor/outdoor classification. In another example, if the mobile device determines that the mobile device processed a large number of messages during a predetermined time duration (e.g., a number of processed messages being greater than a message threshold), the mobile device may perform the alternative message processing 916 and drop the message, instead of the message processing 908 based on the indoor/outdoor classification.

As an example, when there is a match between a particular type of the message and a policy, the mobile device may apply processing conditions of the policy associated with the particular type of message, according to an example policy implementation defined as:

```
Matching message type: "the message type."
    If (the device's Indoor/Outdoor classification attribute is one of {set
    of attributes}) then
        apply the following set of Actions.
    Else
        apply the following other set of Actions.
    End
```

In the above example implementation, "Actions" for message processing may include at least one of message dropping, message forwarding, message rewriting or generation of a new message, etc. An "Action" may further specify a particular communication interface where the message is forwarded. An "Action" may also request duplication of messages and forwarding of duplicates on different interfaces. If the processing conditions are provided via a header of a message, the processing conditions may be in a compressed format, where the set of indoor/outdoor classification attributes and the actions are represented by predefined bit strings.

Three use examples of the policies are explained as follows. The first example (Example 1) is related to the fire alert service discussed above. The second example (Example 2) is related to the coupon service discussed above. The third example (Example 3) is related to the relaying service discussed above, and includes three sub-examples (Examples 3.1, 3.2, and 3.3). It is noted that the use examples are not limited to the three examples provided below.

Example 1

In the fire alert service, the service sends an evacuation request message only to mobile devices that are inside. The fire alert service broadcasts evacuation requests on a wireless interface. The message header includes a string that specifies the service type of the message (e.g., "Evacuation Request"). The mobile device receives the message on the wireless interface, and determines based on the header of the message that the message type is "Evacuation Request." The mobile device matches the message type to a policy associated with the message type "Evacuation Request." The policy table contains a policy with a matching entry:

```
Matching message type: "Evacuation Request".
    If (classification attribute == "Indoors") then
        Action = forward message.
    Else
        Action = drop message.
    End
```

The Processing Function retrieves the device's current indoor/outdoor classification attribute from an indoor/outdoor classification function and applies the processing conditions of the policy. In this example, if the mobile device determines that the indoor/outdoor classification attribute is indoors, the mobile device forwards the evacuation request message to an application layer of the mobile device, such that the mobile device may output the evacuation request message. Otherwise, the mobile device drops the message without forwarding the message.

Example 2

The advertisement device sends coupons to a targeted group of mobile devices. The advertisement device broadcasts a message including a coupon on a wireless interface. The message includes a string that specifies the service type of the message (e.g., "Coupon service"), as well as an indoor/outdoor specifier that matches the desired indoor/outdoor-classification. The mobile device receives the message on the wireless interface, and determines based on the header of the message that the message type is "Coupon Service." The mobile device matches the message type to a policy associated with the message type "Coupon Service." The policy table contains a policy with a matching entry

```
Matching message type: "Coupon Service".
    If (classification attribute == indoor/outdoor specifier) then
        Action = forward message.
    Else
        Action = drop message.
    End
```

In this case, the message sender can impose the processing conditions on the message receiver because the message sender may define the indoor/outdoor specifier. For example, the coffee shop mentioned above may set the indoor/outdoor specifier to "outdoors," such that if the mobile device's indoor/outdoor classification attribute is "outdoors," the mobile device forwards the message to an application layer of the mobile device, such that the mobile device may output the message. A more refined specifier and more refined indoor/outdoor classification may be utilized. For example, to ensure more locally confined message delivery, the coffee shop may set the indoor/outdoor specifier to "urban canyon" and/or "adjacent to the building," such that only mobile devices located outside and near the coffee shop building may output the coupon message. The mobile device may utilize a more refined indoor/outdoor classification as explained above in relation to FIGS. 6-8.

Example 3

A relaying service enables multi-hop range extension of D2D discovery only for In-to-Out and Out-to-In proximity events. The proximity service may involve three entities: a message sender, a message relaying entity, and the message receiver. For example, a message sender may send a proximity message to a message relaying entity, and the message relaying entity relays the proximity message from the message sender to the message receiver. To reduce an amount of resource consumed by relaying a message, only devices that are located indoors near an opening such as a window or a door should be allowed to perform message relaying. Further, to retain the notion of proximity, the range extension due to relaying should only be available for In-to-Out and Out-to-In proximity events.

Example 3.1

The message sender creates a proximity message on an application layer. The application in the application layer includes the message type="Proximity message" in the header of the proximity message. The message sender matches the message type to a policy associated with the message type "Proximity message." The policy table contains a policy with entries:

```
Matching message type: "Proximity message".
    If (message arrives from higher protocol layer) then
        Action1 = insert device's attribute into message header.
        Action2 = set "Rebroadcast" flag = 0 in message header.
        Action3 = broadcast message on air interface
    Else
        Action = None
    End
```

In this case, all proximity messages from a higher protocol layer (e.g., application layer) have the message sender's present indoor/outdoor classification attribute inserted in the message header of the proximity message (e.g., according to "Action1"). After inserting the sender's indoor/outdoor classification attribute into the header of the proximity message, the message sender sets the rebroadcast flag to 0 (e.g., "Action2"), indicating that no relay/rebroadcast has been performed. The message sender also broadcasts the proximity message on the air interface (e.g., "Action3"). The air interface may be a direct D2D air interface such as a direct D2D interface over LTE or a direct D2D interface over Wi-Fi.

Example 3.2

The message relay entity receives the proximity message on the wireless air interface. The message relay entity determines based on the header of the proximity message that the message type is "Proximity message." The message relay entity matches the message type to a policy associated with the message type "Proximity message." The policy table contains a policy with entries:

```
Matching message type: "Proximity message".
    If (message arrives on air interface && classification attribute ==
        "Indoors at window" && "Rebroadcast" flag == 0) then
        Action1 = set "Rebroadcast" flag = 1 in message header.
        Action2 = broadcast message on air interface
    Else
        Action = None
    End
```

In this case, if the mobile device has received a proximity message on the air interface but the proximity message has not been rebroadcast/relayed before (e.g., indicated by the rebroadcast flag being zero), and if the relay entity is located indoors at a window according to the indoor/outdoor classification attribute of the relay entity, the message relay entity sets the rebroadcast flag in the proximity message to 1 and rebroadcasts the proximity message on the air interface. The relay entity sets the rebroadcast flag in the proximity message to ensure that no further rebroadcasting occurs by other relays receiving a rebroadcast message with the rebroadcast flag of 1.

Example 3.3

The message receiver receives the proximity message on the wireless air interface. The message receiver determines based on the header of the proximity message that the message type is "Proximity message." The message receiver matches the message type to a policy associated with the message type "Proximity message." The policy table contains a policy with entries:

```
Matching message type: "Proximity message".
    Processing condition 1: (no range extension)
        If (message arrives on air interface && "Rebroadcast" flag ==
            0") then
            Action = forward message to upper protocol layer
        Else
            Action = None
        End
    Processing condition 2: (range extension In-to-Out)
        If (message arrives on air interface && "Rebroadcast" flag ==
            1" && classification attribute == "Outdoors" && originator's
            attribute == "Indoors") then
            Action = forward message to upper protocol layers
        Else
            Action = None
        End
    Processing condition 3: (range extension Out-to-In)
        If (message arrives on air interface && "Rebroadcast" flag ==
            1" &&" classification attribute == "Indoors" && originator's
            attribute == "Outdoors") then
            Action = forward message to upper protocol layers
        Else
            Action = drop message
        End
```

In this case, all proximity messages received on the air interface are forwarded to upper protocol layers of the mobile device, if the proximity messages are: (1) original non-relayed messages (indicated by the rebroadcast flag of 0), or (2) relayed proximity messages (indicated by the rebroadcast flag of 1) originated by a device located indoors while the receiving device is located outdoors (indicated by the originator's attribute being "Indoors" and the classification attribute being "Outdoors"), or (3) relayed proximity messages (indicated by the rebroadcast flag of 1) originated by a device located outdoors while the receiving device is located indoors (indicated by the originator's attribute being "Outdoors" and the classification attribute being "Indoors"). When the message is forwarded to an upper protocol layer such as an application layer of the mobile device, the mobile device may output the message. On the other hand, if none of the above three conditions applies, the receive device drops the message.

Figure 10:
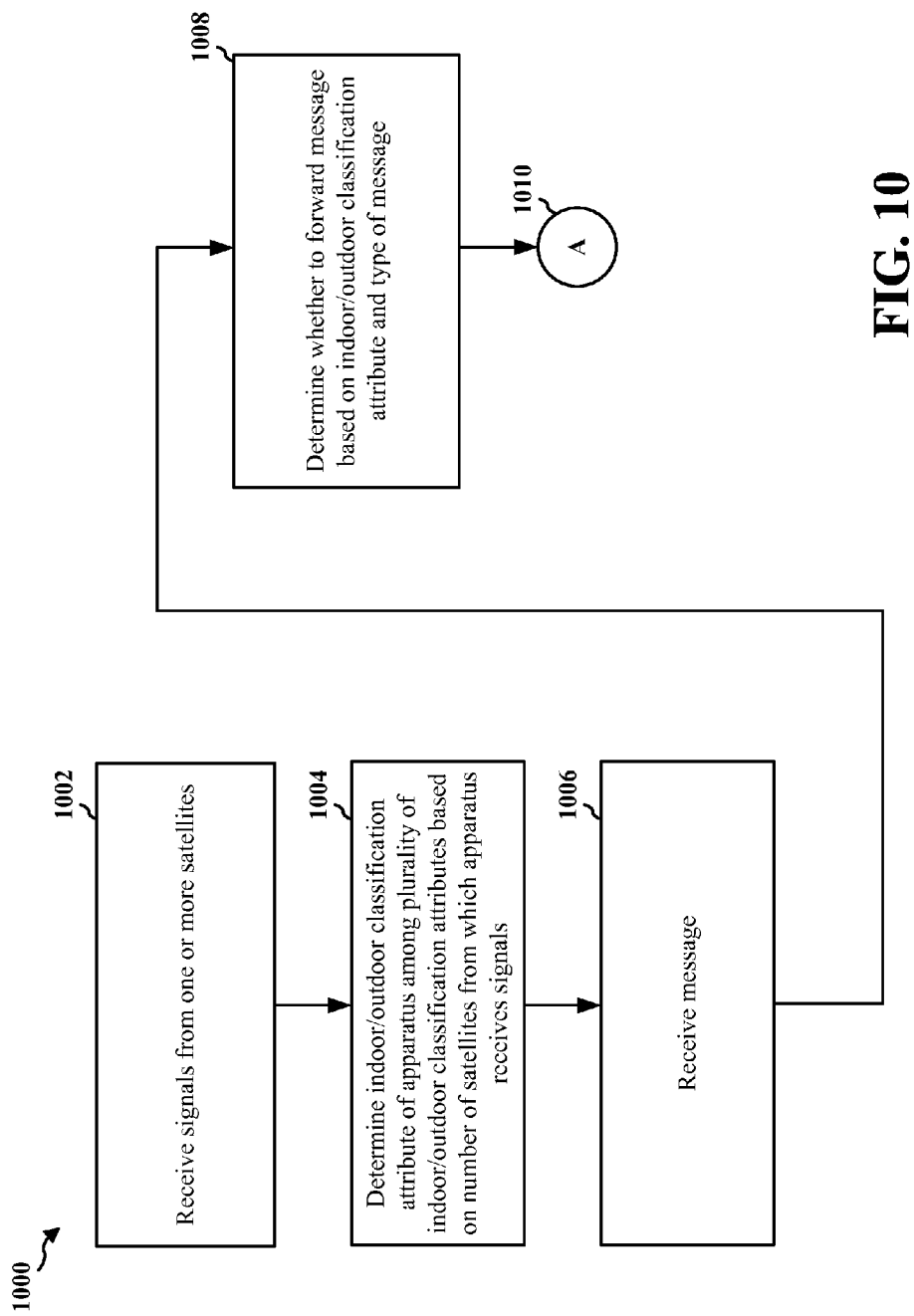
FIG. 10 is a flowchart of a method of wireless communication.

FIG. 10 is a flowchart 1000 of a method of wireless communication. The method may be performed by a mobile device (e.g., the UE 102, the UE 502, 532, 562, 602, 702, 802, the apparatus 1202/1202'). At 1002, the mobile device receives signals from one or more satellites. In an aspect, the signals from the one or more satellites may be GNSS signals from the one or more satellites. At 1004, the mobile device determines an indoor/outdoor classification attribute of the apparatus among a plurality of indoor/outdoor classification attributes based on a number of satellites from which the apparatus receives the signals. For example, as discussed supra, the mobile device determines how many satellite fixes are obtained (e.g., by determining a number of satellites from which the device is able to receive signals. For example, as discussed supra, based on the number of satellite fixes, the mobile device may determine a location information about the mobile device that indicates that the mobile device is indoors or outdoors or in-between the indoors and the outdoors, thus autonomously determining the indoor/outdoor classification of the mobile device.

At 1006, the mobile device receives a message. At 1008, the mobile device determines whether to forward the message based on the indoor/outdoor classification attribute and a type of the message. For example, as discussed supra, when a message is received, the mobile device matches a policy with a type of the message, and processes the message based on the processing rule of the matched policy to determine whether to forward the message based on the indoor/outdoor classification attribute. In an aspect, at 1008, the mobile device may determine whether to forward the message by determining a processing rule associated with the type of the message, and applying the processing rule based on the indoor/outdoor classification attribute to determine whether to forward the message. For example, as discussed supra, the mobile device may maintain policies that define message processing rules for different types of messages, and the mobile device may apply a processing rule for a particular message type based on the mobile device's indoor/outdoor classification. In such an aspect, the message may be received from another apparatus, and the applying the processing rule may be further based on at least one of a reception interface of the message, a retransmission status of the message, or an indoor/outdoor classification attribute of the another apparatus. For example, as discussed supra, if a proximity message has been received on the air interface but has not been rebroadcast/relayed before (e.g., indicated by the rebroadcast flag being zero), and if the relay entity is located indoors at a window according to the indoor/outdoor classification attribute of the relay entity, the message relay entity sets the rebroadcast flag in the proximity message to 1 and rebroadcasts the proximity message on the air interface. In an aspect, at 1008, the mobile device may determine whether to forward the message by determining not to forward the message when there is no processing rule associated with the type of the message. For example, as discussed supra, if there is no policy that matches with the type of the received message, the mobile device may drop the message and may not forward the message. At 1010, the mobile device may perform additional features, as discussed infra.

In an aspect, each of the plurality of indoor/outdoor classification attributes is mapped to a range of a number of satellites from which the apparatus receives signals, the plurality of indoor/outdoor classification attributes comprising at least one of an indoor classification, an outdoor classification, or an in-between classification. In such an aspect, the indoor classification is mapped to the range being one or zero satellites from which the apparatus can receive signals, the outdoor classification is mapped to the range being three or more satellites from which the apparatus can receive signals and the in-between classification is mapped to the range being two satellites from which the apparatus can receive signals. For example, as discussed supra, the number of satellite fixes may be mapped to a corresponding indoor/outdoor classification. For example, as shown in Table 1, if the number of satellite fixes is equal to or greater than three, the mobile device determines that the indoor/outdoor classification attribute for the mobile device is "outdoors." For example, as shown in Table 1, if the number of satellite fixes is equal to two, the mobile device determines that the indoor/outdoor classification attribute for the mobile device is "in-between," indicating that the mobile device is located in-between the indoors and the outdoors. For example, as shown in Table 1, if the number of satellite fixes is less than or equal to one, the mobile device determines that the indoor/outdoor classification attribute for the mobile device is "indoors."

In an aspect, the determination of the indoor/outdoor classification attribute among the plurality of indoor/outdoor classification attributes is further based on at least one of a location of the apparatus or locations of the one or more satellites from which the apparatus receives the signals. For example, as discussed supra, the indoor/outdoor classification may be more refined by considering locations of satellites for which satellite fixes are obtained, with respect to a location of the mobile device, in addition to considering the number of satellite fixes.

In an aspect, the determination of the indoor/outdoor classification attribute among the plurality of indoor/outdoor classification attributes is further based on signal strength measurements of the one or more satellites from which the apparatus receives the signals. In such an aspect, the indoor/outdoor classification attribute is determined based on the number of satellites from which the apparatus receives the signals with signal strength measurements greater than a signal strength threshold. For example, as discussed supra, the mobile device may measure signal strength of a signal received from a satellite and determine whether the mobile device has successfully received a signal to obtain a satellite fix. For example, as discussed supra, the mobile device may determine that the mobile device has successfully received a signal from a satellite to obtain a satellite fix if the signal strength of the signal is above a signal strength threshold.

In an aspect, the message is received from at least one of an upper layer in the apparatus, an internal interface in the apparatus, or a physical communication interface with another apparatus. For example, as discussed supra, the mobile device may receive the message via a communication interface (e.g., a wireless interface), from an internal interface within the mobile device, and/or from a higher protocol layer (e.g., an application layer).

In an aspect, the message is forwarded to at least one of an upper layer in the apparatus, an internal interface in the apparatus, or a physical communication interface with another apparatus when the apparatus determines to forward the message. For example, as discussed supra, if the mobile device determines to forward the received message, the mobile device may forward the message to a communication interface (e.g., a wireless interface), to an internal interface within the mobile device, and/or to a higher protocol layer (e.g., an application layer), based on the matching policy.

In an aspect, the message is received as a discovery message or is forwarded as a discovery message when the apparatus determines to forward the message or the message is received and forwarded as a discovery message when the apparatus determines to forward the message. For example, as discussed supra, a mobile device may receive a message (e.g., discovery message) and relay the message to other mobile devices, which results in multi-hop communication to mobile devices that are far from the building. In an aspect, the message supports a proximity service. For example, as discussed supra, in a multi-hop relay use example, a proximity message may be communicated.

Figure 11:
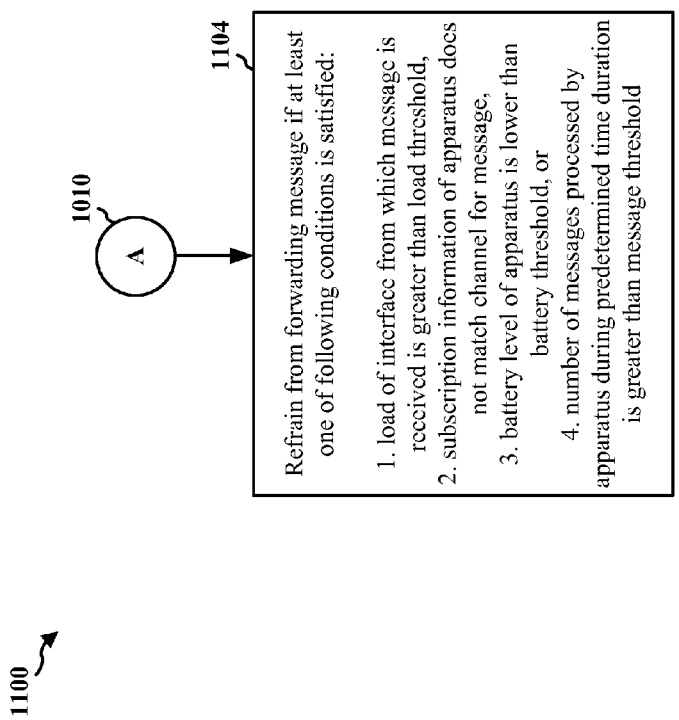
FIG. 11 is a flowchart of a method of wireless communication, expanding from the flowchart of FIG. 10.

FIG. 11 is a flowchart 1100 of a method of wireless communication, expanding from the flowchart 1000 of FIG. 10. The method may be performed by a mobile device (e.g., the UE 102, the UE 502, 532, 562, 602, 702, 802, the apparatus 1202/1202'). At 1010, the mobile device continues from the flowchart 1000 of FIG. 10. At 1202, the mobile device refrains from forwarding the message if at least one of following conditions is satisfied: a load of an interface from which the message is received is greater than a load threshold, subscription information of the apparatus does not match a channel for the message, a battery level of the apparatus is lower than a battery threshold, or a number of messages processed by the apparatus during a predetermined time duration is greater than a message threshold. For example, as discussed supra, if the mobile device determines that a load on a communication interface (e.g., wireless interface) is greater than a load threshold, the mobile device may drop the message and thus may refrain from forwarding the message. For example, as discussed supra, if the mobile device determines at 904 that the user of the mobile device is not subscribed to a service or a channel associated with the received message, the mobile device may perform the alternative message processing 916 and drop the message. For example, as discussed supra, if the mobile device determines that the battery level of the mobile device is low (e.g., lower than a battery threshold), the mobile device may perform the alternative message processing 916 and drop the message. For example, as discussed supra, if the mobile device determines that the mobile device processed a large number of messages during a predetermined time duration (e.g., a number of processed messages being greater than a message threshold), the mobile device may perform the alternative message processing 916 and drop the message.

Figure 12:
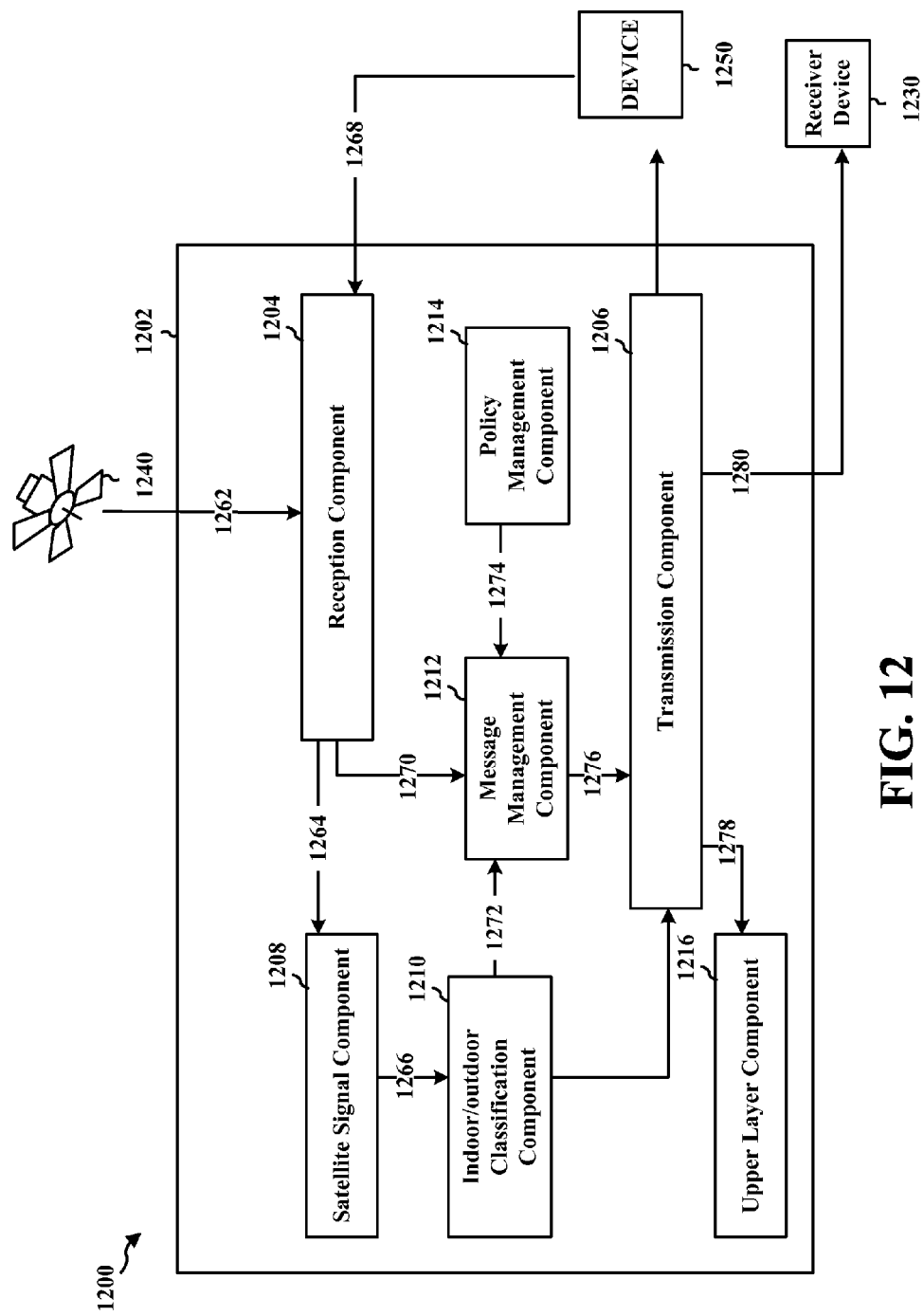
FIG. 12 is a conceptual data flow diagram illustrating the data flow between different means/components in an exemplary apparatus.
Figure 13:
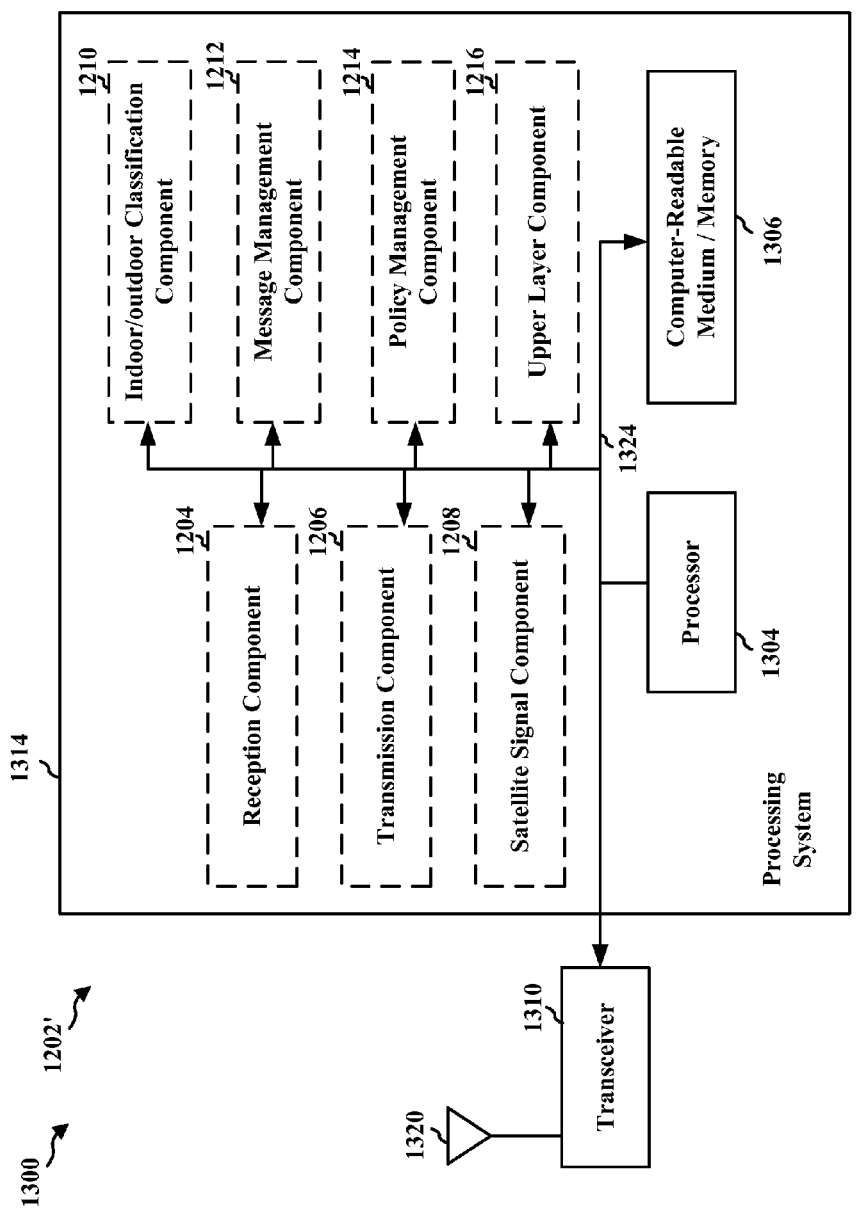
FIG. 13 is a diagram illustrating an example of a hardware implementation for an apparatus employing a processing system.

FIG. 12 is a conceptual data flow diagram 1200 illustrating the data flow between different means/components in an exemplary apparatus 1202. The apparatus may be a mobile device such as a UE. The apparatus includes a reception component 1204, a transmission component 1206, a satellite signal component 1208, an indoor/outdoor classification component 1210, a message management component 1212, and a policy management component 1214.

The satellite signal component 1208 receives via the reception component 1204 signals from one or more satellites (e.g., satellite 1240), at 1262 and 1264. In an aspect, the signals from the one or more satellites may be GNSS signals from the one or more satellites. The indoor/outdoor classification component 1210 considers the signals from the one or more satellites at 1266. The indoor/outdoor classification component 1210 determines an indoor/outdoor classification attribute of the apparatus among a plurality of indoor/outdoor classification attributes based on a number of satellites from which the apparatus receives the signals. The message management component 1212 receives via the reception component 1204 a message from a device 1250, at 1268 and 1270.

The message management component 1212 determines whether to forward the message based on the indoor/outdoor classification attribute (e.g., received from the indoor/outdoor classification component 1210 at 1272) and a type of the message (e.g., considered by the policy management component 1214 at 1274). If the message management component 1212 determines to forward the message, the message management component 1212 forwards the message via the transmission component 1206, at 1276, where the message may be forwarded to an upper layer component 1216 at 1278 and/or to a receiver device 1230 at 1280. In an aspect, message management component 1212 may determine whether to forward the message by determining a processing rule associated with the type of the message (e.g., where the processing rule is received from the policy management component 1214 at 1274), and applying the processing rule based on the indoor/outdoor classification attribute to determine whether to forward the message. In such an aspect, the message is received from another apparatus (e.g., the device 1250), and the applying the processing rule is further based on at least one of a reception interface of the message, a retransmission status of the message, or an indoor/outdoor classification attribute of the another apparatus (e.g., the device 1250). The message management component 1212 may determine whether to forward the message by determining not to forward the message when there is no processing rule associated with the type of the message.

In an aspect, the message management component 1212 refrains from forwarding the message if at least one of the following conditions is satisfied: a load of an interface from which the message is received is greater than a load threshold, subscription information of the apparatus does not match a channel for the message, a battery level of the apparatus is lower than a battery threshold, or a number of messages processed by the apparatus during a predetermined time duration is greater than a message threshold.

In an aspect, each of the plurality of indoor/outdoor classification attributes is mapped to a range of a number of satellites from which the apparatus receives signals, the plurality of indoor/outdoor classification attributes comprising at least one of an indoor classification, an outdoor classification, or an in-between classification. In such an aspect, the indoor classification is mapped to the range being one or zero satellites from which the apparatus can receive signals, the outdoor classification is mapped to the range being three or more satellites from which the apparatus can receive signals and the in-between classification is mapped to the range being two satellites from which the apparatus can receive signals.

In an aspect, the determination of the indoor/outdoor classification attribute among the plurality of indoor/outdoor classification attributes is further based on at least one of a location of the apparatus or locations of the one or more satellites from which the apparatus receives the signals. In an aspect, the determination of the indoor/outdoor classification attribute among the plurality of indoor/outdoor classification attributes is further based on signal strength measurements of the one or more satellites from which the apparatus receives the signals. In such an aspect, the indoor/outdoor classification attribute is determined based on the number of satellites from which the apparatus receives the signals with signal strength measurements greater than a signal strength threshold.

In an aspect, the message is received from at least one of an upper layer in the apparatus, an internal interface in the apparatus, or a physical communication interface with another apparatus. In an aspect, the message is forwarded to at least one of an upper layer in the apparatus, an internal interface in the apparatus, or a physical communication interface with another apparatus when the apparatus determines to forward the message.

In an aspect, the message is received as a discovery message or is forwarded as a discovery message when the apparatus determines to forward the message or the message is received and forwarded as a discovery message when the apparatus determines to forward the message. In an aspect, the message supports a proximity service.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 14 is a diagram 1400 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, and 1216. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for receiving signals from one or more satellites, means for determining an indoor/outdoor classification attribute of the apparatus among a plurality of indoor/outdoor classification attributes based on a number of satellites from which the apparatus receives the signals, means for receiving a message, and means for determining whether to forward the message based on the indoor/outdoor classification attribute and a type of the message. In an aspect, the means for determining whether to forward the message is configured to determine a processing rule associated with the type of the message, and to apply the processing rule based on the indoor/outdoor classification attribute to determine whether to forward the message. In an aspect, the means for determining whether to forward the message is configured to determine not to forward the message when there is no processing rule associated with the type of the message. In an aspect, the apparatus 1202/1202' includes means for refraining from forwarding the message if at least one of following conditions is satisfied: a load of an interface from which the message is received is greater than a load threshold, subscription information of the apparatus does not match a channel for the message, a battery level of the apparatus is lower than a battery threshold, or a number of messages processed by the apparatus during a predetermined time duration is greater than a message threshold.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by an apparatus, comprising:

receiving signals from one or more satellites;

determining an indoor/outdoor classification attribute of the apparatus among a plurality of indoor/outdoor classification attributes based on a number of satellites from which the apparatus receives the signals;
receiving a message; and
determining whether to forward the message based on the indoor/outdoor classification attribute and a type of the message.

2. The method of claim 1, wherein the signals from the one or more satellites are global navigation satellite system (GNSS) signals from the one or more satellites.

3. The method of claim 1, wherein the determining whether to forward the message comprises:
determining a processing rule associated with the type of the message; and
applying the processing rule based on the indoor/outdoor classification attribute to determine whether to forward the message.

4. The method of claim 3, wherein the message is received from another apparatus, and wherein the applying the processing rule is further based on at least one of a reception interface of the message, a retransmission status of the message, or an indoor/outdoor classification attribute of the another apparatus.

5. The method of claim 1, wherein the determining whether to forward the message comprises:
determining not to forward the message when there is no processing rule associated with the type of the message.

6. The method of claim 1, wherein each of the plurality of indoor/outdoor classification attributes is mapped to a range of a number of satellites from which the apparatus receives signals, the plurality of indoor/outdoor classification attributes comprising at least one of an indoor classification, an outdoor classification, or an in-between indoor/outdoor classification.

7. The method of claim 6, wherein the indoor classification is mapped to the range being one or zero satellites from which the apparatus can receive signals, the outdoor classification is mapped to the range being three or more satellites from which the apparatus can receive signals and the in-between indoor/outdoor classification is mapped to the range being two satellites from which the apparatus can receive signals.

8. The method of claim 1, wherein the determination of the indoor/outdoor classification attribute among the plurality of indoor/outdoor classification attributes is further based on at least one of a location of the apparatus or locations of the one or more satellites from which the apparatus receives the signals.

9. The method of claim 1, wherein the determination of the indoor/outdoor classification attribute among the plurality of indoor/outdoor classification attributes is further based on signal strength measurements of the one or more satellites from which the apparatus receives the signals.

10. The method of claim 9, wherein the indoor/outdoor classification attribute is determined based on the number of satellites from which the apparatus receives the signals with signal strength measurements greater than a signal strength threshold.

11. The method of claim 1, wherein the message is received from at least one of an upper layer in the apparatus, an internal interface in the apparatus, or a physical communication interface with another apparatus.

12. The method of claim 1, wherein the message is forwarded to at least one of an upper layer in the apparatus, an internal interface in the apparatus, or a physical communication interface with another apparatus when the apparatus determines to forward the message.

13. The method of claim 1, wherein the message is received as a discovery message or is forwarded as a discovery message when the apparatus determines to forward the message or the message is received and forwarded as a discovery message when the apparatus determines to forward the message.

14. The method of claim 1, wherein the message supports a proximity service.

15. The method of claim 1, further comprising:
refraining from forwarding the message if at least one of following conditions is satisfied:
a load of an interface from which the message is received is greater than a load threshold, subscription information of the apparatus does not match a channel for the message;
a battery level of the apparatus is lower than a battery threshold, or
a number of messages processed by the apparatus during a predetermined time duration is greater than a message threshold.

16. An apparatus for wireless communication, comprising:
a memory; and
at least one processor coupled to the memory and configured to:
receive signals from one or more satellites;
determine an indoor/outdoor classification attribute of the apparatus among a plurality of indoor/outdoor classification attributes based on a number of satellites from which the apparatus receives the signals;
receive a message; and
determine whether to forward the message based on the indoor/outdoor classification attribute and a type of the message.

17. The apparatus of claim 16, wherein the at least one processor configured to determine whether to forward the message is configured to:
determine a processing rule associated with the type of the message; and
apply the processing rule based on the indoor/outdoor classification attribute to determine whether to forward the message.

18. The apparatus of claim 16, wherein the at least one processor configured to determine whether to forward the message is configured to:
determine not to forward the message when there is no processing rule associated with the type of the message.

19. The apparatus of claim 16, wherein each of the plurality of indoor/outdoor classification attributes is mapped to a range of a number of satellites from which the apparatus receives signals, the plurality of indoor/outdoor classification attributes comprising at least one of an indoor classification, an outdoor classification, or an in-between indoor/outdoor classification.

20. The apparatus of claim 16, wherein the determination of the indoor/outdoor classification attribute among the plurality of indoor/outdoor classification attributes is further based on at least one of a location of the apparatus or locations of the one or more satellites from which the apparatus receives the signals.

21. The apparatus of claim 16, wherein the determination of the indoor/outdoor classification attribute among the plurality of indoor/outdoor classification attributes is further based on signal strength measurements of the one or more satellites from which the apparatus receives the signals.

22. The apparatus of claim 16, wherein the message is received from at least one of an upper layer in the apparatus, an internal interface in the apparatus, or a physical communication interface with another apparatus.

23. The apparatus of claim 16, wherein the message is forwarded to at least one of an upper layer in the apparatus, an internal interface in the apparatus, or a physical communication interface with another apparatus when the at least one processor determines to forward the message.

24. The apparatus of claim 16, wherein the message is received as a discovery message or is forwarded as a discovery message when the apparatus determines to forward the message or the message is received and forwarded as a discovery message when the at least one processor determines to forward the message.

25. The apparatus of claim 16, wherein the at least one processor is further configured to:
refrain from forwarding the message if at least one of following conditions is satisfied:
a load of an interface from which the message is received is greater than a load threshold, subscription information of the apparatus does not match a channel for the message;
a battery level of the apparatus is lower than a battery threshold, or
a number of messages processed by the apparatus during a predetermined time duration is greater than a message threshold.

26. An apparatus for wireless communication, comprising:
means for receiving signals from one or more satellites;
means for determining an indoor/outdoor classification attribute of the apparatus among a plurality of indoor/outdoor classification attributes based on a number of satellites from which the apparatus receives the signals;
means for receiving a message; and
means for determining whether to forward the message based on the indoor/outdoor classification attribute and a type of the message.

27. The apparatus of claim 26, wherein the means for determining whether to forward the message is configured to:
determine a processing rule associated with the type of the message; and
apply the processing rule based on the indoor/outdoor classification attribute to determine whether to forward the message.

28. The apparatus of claim 26, wherein the means for determining whether to forward the message is configured to:
determine not to forward the message when there is no processing rule associated with the type of the message.

29. The apparatus of claim 26, further comprising:
means for refraining from forwarding the message if at least one of following conditions is satisfied:
a load of an interface from which the message is received is greater than a load threshold, subscription information of the apparatus does not match a channel for the message;
a battery level of the apparatus is lower than a battery threshold, or
a number of messages processed by the apparatus during a predetermined time duration is greater than a message threshold.

30. A non-transitory computer-readable medium storing computer executable code for wireless communication, comprising code for:
receiving signals from one or more satellites;
determining an indoor/outdoor classification attribute of the apparatus among a plurality of indoor/outdoor classification attributes based on a number of satellites from which the apparatus receives the signals;
receiving a message; and
determining whether to forward the message based on the indoor/outdoor classification attribute and a type of the message.

* * * * *